July 11, 1967 T. L. MAIONE 3,331,022
ELECTRICAL POWER MEASURING BRIDGE USING RADIANT ENERGY
Filed Feb. 21, 1963
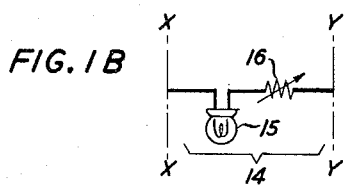
FIG. 1B
FIG. 1A
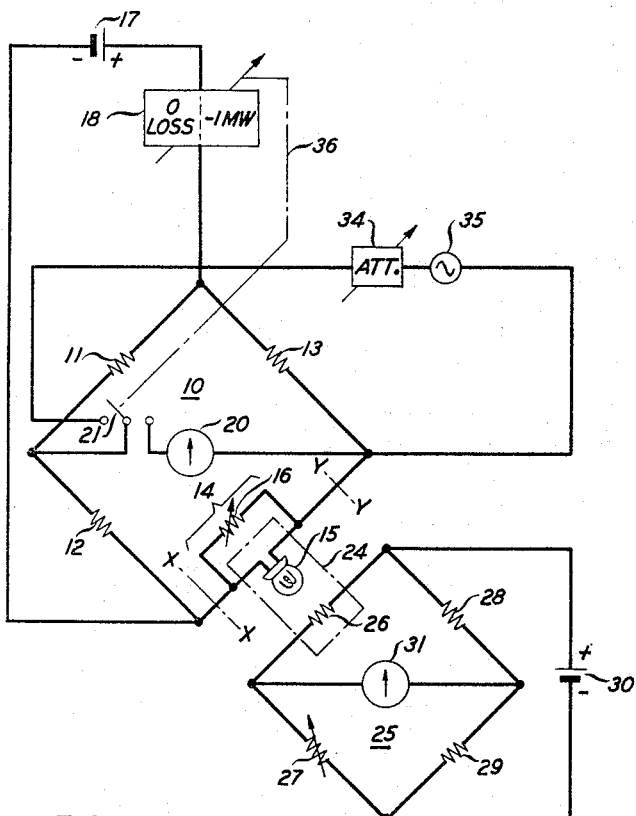
FIG. 2
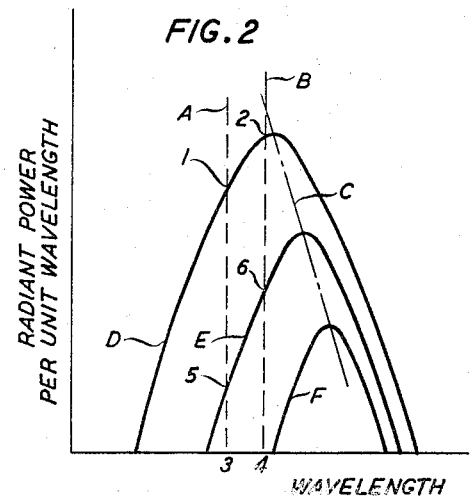
INVENTOR
T. L. MAIONE
BY Patrick J. Roche
ATTORNEY

United States Patent Office 3,331,022
Patented July 11, 1967

3,331,022
ELECTRICAL POWER MEASURING BRIDGE
USING RADIANT ENERGY
Theodore L. Maione, Little Silver, N.J., assignor to Bell Telephone Laboratories, Incorporated, New York, N.Y., a corporation of New York
Filed Feb. 21, 1963, Ser. No. 260,141
2 Claims. (Cl. 324—96)

This invention relates to an electrical power measuring bridge, and more specifically to such measuring bridge using radiant energy.

Heretofore, electrical power measuring apparatus of one type employed a thermocouple unit. It was found that such unit could be seriously damaged by a slight overload. Moreover, it was also found that the thermocouple unit did not present a precise impedance match to the load whose power was being measured. As a consequence, the thermocouple unit tended to introduce error into the measurements. Also, electrical power measuring apparatus of another type included a thermistor. One difficulty with this meter was that the sensitivity of the thermistor varied from unit to unit, and the measuring apparatus tended to heat the thermistor thereby tending to introduce error into the measurements.

The present invention provides an improved power measuring bridge using radiant energy.

The principal object of the present invention is to provide an electrical power measuring bridge of improved accuracy.

Another object is to improve the impedance match between an electrical power measuring bridge and the load to which it is connected.

A further object is to improve the sensitivity of an electrical power measuring bridge.

Still another object is to provide an improved electrical power measuring bridge which is rugged and compact.

A still further object is to provide an electrical power measuring bridge which is capable of absorbing overloads without impairing its accuracy.

Still another object is to provide an electrical power measuring bridge of a simple design.

A specific embodiment of the present invention comprises a first Wheatstone bridge having a source of variable light intensity and a first variable resistor in one arm, a source of standard voltage connected to one diagonal, a first null meter connectable to the other bridge diagonal, and a calibrated attenuator interposed in series between the positive terminal of the standard voltage source and one terminal of the one bridge diagonal, a second Wheatstone bridge having a light sensitive element in one arm disposed in proximity of the light source, a second variable resistor in a second arm, a fixed resistor in each of the remaining two arms, a second null meter connected to one diagonal, and a battery to the other diagonal, a supply of unknown high-frequency power, a second attenuator, and a single-pole double-throw switch to control the connections of the first null meter and unknown power supply to the other diagonal of the first bridge.

In operation, with the unknown power supply disconnected from the first Wheatstone bridge, the first null meter connected to the other diagonal of the first bridge, and the first calibrated attenuator adjusted to 0 loss relative to the standard voltage, the first variable resistor is adjusted to provide the one arm of the first bridge with such amount of effective resistance as to cause the light source to supply a first amount of light output. This serves to establish balance in the first bridge and thereby a null reading on the first meter. This first amount of light output sensed by the light sensitive element establishes a first value of effective resistance therein. Adjustment of the second variable resistor establishes balance in the second bridge and thereby a null reading on the second meter. The power measuring bridge is now calibrated for producing a measurement.

For this purpose of a measurement, the first null meter is disconnected from the first bridge, the switch is operated to connect the second attenuator to the other diagonal of the first bridge, and at the same time the first calibrated attenuator is adjusted to subtract 1 milliwatt of power from the power supplied by the standard voltage source to the first bridge, or in other words, to introduce a 1 milliwatt loss in such power. This decreases the temperature of the light source and thereby decreases the light output of the light source to a corresponding amount to upset the balance of the first bridge. This decreased amount of light output sensed by the light sensitive element causes the latter to increase its effective resistance thereby unbalancing the second bridge to the extent indicated by the second null meter. The light output of the light source comprises the light intensity or brightness of the light source and the spectral distribution.

Next, the second attenuator is adjusted to supply the unknown power to the first bridge in specific increments until balance is restored to both the first and second bridges as indicated by the second null meter. This means that the light output of the light source has been restored to its first value. This increased light output sensed by the light sensitive element decreases the effective resistance thereof to enable the restoration of balance in the second bridge. At this point the amount of unknown power supplied to the light source is 0 decibel milliwatt, which is equal to the 1 milliwatt of power subtracted from the first bridge. Now, the power dissipated in the light source, the light output of the light source and the effective resistance of the light sensitive element have the respective values that they had when the first bridge was balanced at the 0-loss relative to the standard voltage supplied to the first bridge via the first calibrated attenuator. One milliwatt of the unknown power is thus measured.

A feature of the invention resides in the combination of a light source of variable light output and a light sensitive element to constitute an extremely sensitive transducer as used with conventional Wheatstone bridges and null meters to obtain improved measuring sensitivity. It is thus apparent that small changes in the unknown power supplied to the light source in the first bridge effect corresponding changes in the light output of the light source, and that these changes sensed by the light sensitive element are reflected as relatively large changes in the effective resistance of the latter element and thereby as corresponding large changes in the unbalances of the second bridge as indicated by the second null meter.

Another feature resides in the optimum optical spacing provided between the light source and light sensitive element of the transducer.

A further feature concerns the transducer per se which provides relatively large meter deflections in response to relatively small power inputs. The measuring bridge utilizes the light output of the light source as a function of its filament temperature and the resistance of the light sensitive element as a function of such light output while at the same time the small changes in the power dissipated in the light source are reflected as correspondingly large changes in the resistance of the light sensitive element. These latter changes effect the correspondingly large meter deflections.

An additional feature is that the transducer operating at very high temperatures tends to minimize the effects of ambient temperature variations on the ultimate measurements.

These and other objects of the invention will be readily understood from the following description taken together with the accompanying drawing in which:

FIG. 1A is a schematic diagram of a specific embodiment of the invention;

FIG. 1B is a circuit modification usuable in FIG. 1; and

FIG. 2 is a family of curves illustrating action obtainable in FIG. 1.

Referring to FIG. 1A, a first Wheatstone bridge 10 includes fixed resistors 11, 12 and 13 in three arms and a light source 15 and an adjustable resistor 16 connected in parallel to constitute a fourth arm 14. A source 17 of a standard and regulated direct-current voltage has its positive terminal connected via a two-position calibrated attenuator 18 to one terminal of the vertical diagonal of the first bridge and its negative terminal to the opposite terminal of the same diagonal. A null meter 20 is connectable across the horizontal diagonal of the first bridge via an appropriate actuation of the swinger arm of a single-pole double-throw switch 21. Obviously, the light source 15 and adjustable resistor 16 may be connected in series in the fourth arm 14 as illustrated in FIG. 1B.

A second Wheatstone bridge 25 includes a light sensitive element 26 in one arm disposed in proximity of the light source in the first bridge, a variable resistor 27 connected in an adjacent arm, and fixed resistors 28 and 29 in the respective remaining two arms. Light source 15 and light sensitive element 26 are contained within an opaque housing 24. A battery 30 and a second null meter 31 are connected across the vertical and horizontal diagonals, respectively, of the second bridge. The switch 21 serves via another appropriate actuation of its swinger arm to connect adjustable attenuator 34 and source 35 of power having a frequency of 20 megacycles and an unknown magnitude in series to the horizontal diagonal of the first bridge. When this happens, it is obvious that the swinger arm of switch 21 has been actuated to disconnect the first null meter 20 from the first horizontal bridge diagonal. A mechanical linkage 36 interconnects calibrated attenuator 18 and the swinger arm of switch 21 in a manner and for a purpose explained later.

In the calibration of the measuring apparatus in FIG. 1A, the swinger arm of switch 21 is actuated to connect first null meter 20 across the horizontal bridge diagonal and to disconnect the unknown power source therefrom, and attenuator 18 is adjusted to its position of 0 loss for the standard voltage source. It is thus apparent that the mechanical linkage is so arranged that when attenuator 18 is adjusted to its 0-loss position, the swinger arm of the switch is closed relative to the first null meter but open relative to the unknown power supply.

Resistor 16 in either FIG. 1A or FIG. 1B is then adjusted to establish a null reading on the first meter 20 thereby indicating balance in the first bridge 10. In this state, the effective resistance of bridge arm 14 is substantially equal to that of each of the bridge arm resistors 11, 12 and 13. This bridge balance provides the bridge arm 14 with a predetermined effective resistance and thereby supplies the light source with a predetermined voltage which effects a certain amount of light output. This output is directed to and sensed by light sensitive element 26 for establishing a corresponding amount of effective resistance therein. Then, resistor 27 is adjusted to establish a null reading on null meter 31 connected to the second bridge. The circuit is now calibrated and ready to provide a measurement.

For the purpose of a measurement, the swinger arm of switch 21 is actuated to disconnect the first null meter 20 from the horizontal diagonal of the first bridge and to connect the unknown power source 35 to the first bridge horizontal diagonal to replace the first null meter, and attenuator 18 is adjusted to subtract 1 milliwatt of the power supplied to the first bridge from the standard voltage source. It is thus apparent that the mechanical linkage is so arranged that when attenuator 18 is adjusted to its "−1 milliwatt" position, the swinger arm of switch 21 is closed relative to the unkonwn power source but open relative to the first null meter. At this time it is evident that the second attenuator 34 blocks substantially the entire amount of unknown power of source 35 from reaching the first bridge. This 1-milliwatt subtraction reduces the voltage supplied to the light source to a value below the predetermined voltage effective at the balance of the first bridge and thereby decreases the light output of the light source to a corresponding amount. This decreased light output sensed by the light sensitive element 26 causes the latter to increase its effective resistance to a correspondingly large amount to unbalance the second bridge 25 to a similarly large amount as indicated by a correspondingly large deflection of the second null meter 31. Thus, the light sensitive element varies its effective resistance inversely as to the light output of the light source.

Next, second attenuator 34 is adjusted to feed the unknown power across the horizontal diagonal of the first bridge in gradually increasing amounts, thereby gradually increasing the voltage supplied to the light source toward the predetermined voltage effective at the balance of the first bridge. This continues until the light source provides the certain amount of light output effective at the balance of the first bridge. This increased light output of the light source sensed by the light sensitive element causes the latter to decrease its effective resistance until the value thereof is reached at which balance is restored to the second bridge as indicated by the second null meter. At this time, exactly 1 milliwatt (0 decibel milliwatt) of unknown power is being supplied to the first bridge.

This signifies that the light output of the light source and the effective resistance of the light sensitive element have been returned to the respective values they had when the calibrated attenuator 18 was adjusted to its 0-loss position, the unknown power source was disconnected from the first bridge, and both the first and second bridges were balanced. Thus, the amount of unknown power supplied to the first bridge is precisely equal to the 1 milliwatt of power which was initially subtracted therefrom. In other words, the amount of power being dissipated in the light source is exactly the amount that was being dissipated therein at the balances of the first and second bridges. The total power supplied by the unknown source is easily determined by adding 1 milliwatt to the power dissipated in attenuator 34.

Since light intensity varies inversely as the square of the distance from the light source, a slight variation in lamp position will be more pronounced at short distances than at greater distances. It was found that the optimum optical distance between the light source and light sensitive element was of the order of one inch or more. It is obvious that the optical distance between the light source and light sensitive element may be less than one inch when slight impairments of the efficiency of the transducer are tolerable and/or without materially adversely affecting the accuracy of the measurements.

In FIG. 2 there are illustrated several light output curves for the preselected light source heated to varying amounts of temperature. For a preselected photosensitive device the useful light response lies between the two vertically parallel lines A and B. The displacement of peak emission wavelength with varying amounts of light-source temperatures is indicated by the slant line C. Curve D represents the preselected light source heated to a first predetermined temperature of the order of 1900 degrees centigrade and providing a useful light output in the area lying between points 1, 2, 3 and 4. Curve E illustrates the preselected light source heated to a second temperature of the order of 1400 degrees centigrade and providing a useful light output in the area lying between points 3, 4, 5 and 6. Curve F shows the preselected light source heated to a third temperature of the order of 900 degrees centigrade and providing no useful light output.

It is thus evident in FIG. 2 that the light output of the preselected light source varies relatively largely with respect to the emission peak shifts of such light source when the latter is undergoing temperature changes. It is therefore apparent that the relatively large resistance changes in the light sensitive element 26 in response to small changes in the power dissipated in the light source 15 are due largely to the additive effects of:

(1) Increasing the power applied to the light source by a given percentage for causing increases in the light output emitted at any wavelength below the response peak by a percentage substantially greater than the given percentage, (2) Increasing the power applied to the light source for causing the response peak thereof to move more into the response band of the light sensitive element, and (3) The specific resistance response of the light sensitive element being very high in response to small changes in the light output of the light source.

The foregoing specific embodiment of the invention included the following parameters at the balances of both bridges 10 and 25:

each of bridge arms 11, 12, 13 and 14 = 75 ohms
light sensitive element 26 = 1250 ohms
adjustable resistor 27 = 1000–1300 ohms
each of resistors 28 and 29 = 5100 ohms
battery 30 = 10 volts Light source 15 has a tungsten filament delivering substantially maximum light output at 1900 degrees centigrade with an applied voltage of 1.35 volts and 6.75 milliamperes.

Light sensitive element 26 is a photoconductive or semiconductor element comprising cadmium selenide, and standard voltage source 17 = 5.400 volts.

While two null meters 20 and 31 are shown, it is obvious that one alone would suffice together with suitable switching, not shown, for connecting the one meter to either bridge diagonal as required.

Although the specific embodiment described above discloses the first bridge having arms of equal resistance, it is obvious that a bridge having arms of unequal resistance would work equally as well. Moreover, it is further obvious that while a ratio of 1 to 1 is disclosed for the purpose of measuring an unknown alternating current power relative to a known direct-current power, it is understood that the apparatus could be expeditiously modified to measure electrical powers of other ratios such, for example, as 3 to 1, 5 to 1, 10 to 1, or any desired ratio. In these latter ratios, it is understood that the larger digit refers to the power supplied by the standard voltage source and the smaller digit to the unknown power. In addition, it is contemplated that while the measured power had a frequency of 20 megacycles per second, power having frequencies ranging from direct current to 20 megacycles or higher could be expeditiously measured. The frequency aspect of the measured power is not a limitation of the use of the apparatus of the invention.

It is to be understood that the above described embodiment is merely illustrative of one application of the principle of the invention. Numerous other arrangements may be devised by those skilled in the art without departing from the spirit and scope of the invention.

What is claimed is:
1. Apparatus which comprises:
a first bridge circuit containing first, second, third and fourth terminals and first, second, third and fourth arms connected respectively between said fourth and first terminals, said first and second terminals, said second and third terminals, and said third and fourth terminals, said first, second and third arms containing selected resistors, and said fourth arm containing both a light source and a variable resistor for adjusting the intensity of said light source and thus the balance of said first bridge,
a double-throw switch connected to said second terminal, said switch containing a first and a second contact,
a first null meter, connected between said first contact of said double-throw switch and said fourth terminal, for indicating when said first bridge is in balance,
a photoresistive element responsive to said light source,
an opaque enclosure containing both said light source and said photoresistive element,
a second bridge circuit containing fifth, sixth, seventh, and eighth terminals, and fifth, sixth, seventh, and eighth arms connected respectively between said eighth and fifth terminals, said fifth and sixth terminals, said sixth and seventh terminals, and said seventh and eighth terminals, said fifth arm containing said photoresistive element, said sixth arm containing a variable resistor for balancing said second bridge, and said seventh and eighth arms containing selected resistors,
a second null meter, connected between said fifth and seventh terminals, for indicating when said second bridge is balanced,
a first voltage source connected between said sixth and eighth terminals,
a standard voltage source,
first variable attenuator means, connected with said standard voltage source between said first and third terminals, for subtracting from said light source a given amount of power derived from said standard voltage source, thereby unbalancing both said first and second bridges,
a source of an unknown amount of power for increasing the light output of said light source by an amount greater than said given amount of power subtracted by said first attenuator,
second variable attenuator means, connected with said source of an unknown amount of power between said fourth terminal and said second contact of said double-throw switch, for reducing the power reaching said first bridge from said source of an unknown amount of power until said second null meter indicates said second bridge is balanced, at which time the power dissipated by said second variable attenuator means equals, in decibels, said unknown amount of power.

2. Apparatus as in claim 1 in which said given amount of power equals one (1) milliwatt.

References Cited

UNITED STATES PATENTS

| | | | |
|---|---|---|---|
| 2,417,820 | 3/1947 | Ginzton | 324—95 |
| 2,641,713 | 6/1953 | Shive | 250—211 |
| 2,773,219 | 12/1956 | Aron | 250—210 X |
| 3,141,131 | 7/1964 | McCoy | 324—96 |

OTHER REFERENCES

Publication: "Self-Contained U.H.F. Wattmeter," by N. H. Ritchey of Advanced Dev. Labs., Sylvania Elec. Prod. Inc., December 1949, pp. 10, 11, 22 and 23 of "Engineering Dept."

WALTER L. CARLSON, *Primary Examiner.*

RUDOLPH V. ROLINEC, *Examiner.*